Sept. 18, 1956  E. BECKER ET AL  2,763,220
FIRING PLANT

Filed Aug. 7, 1950  4 Sheets-Sheet 1

INVENTORS
Ernst Becker and
Helmut Weinstock
BY
Watson, Cole, Grindle & Watson
ATTORNEYS

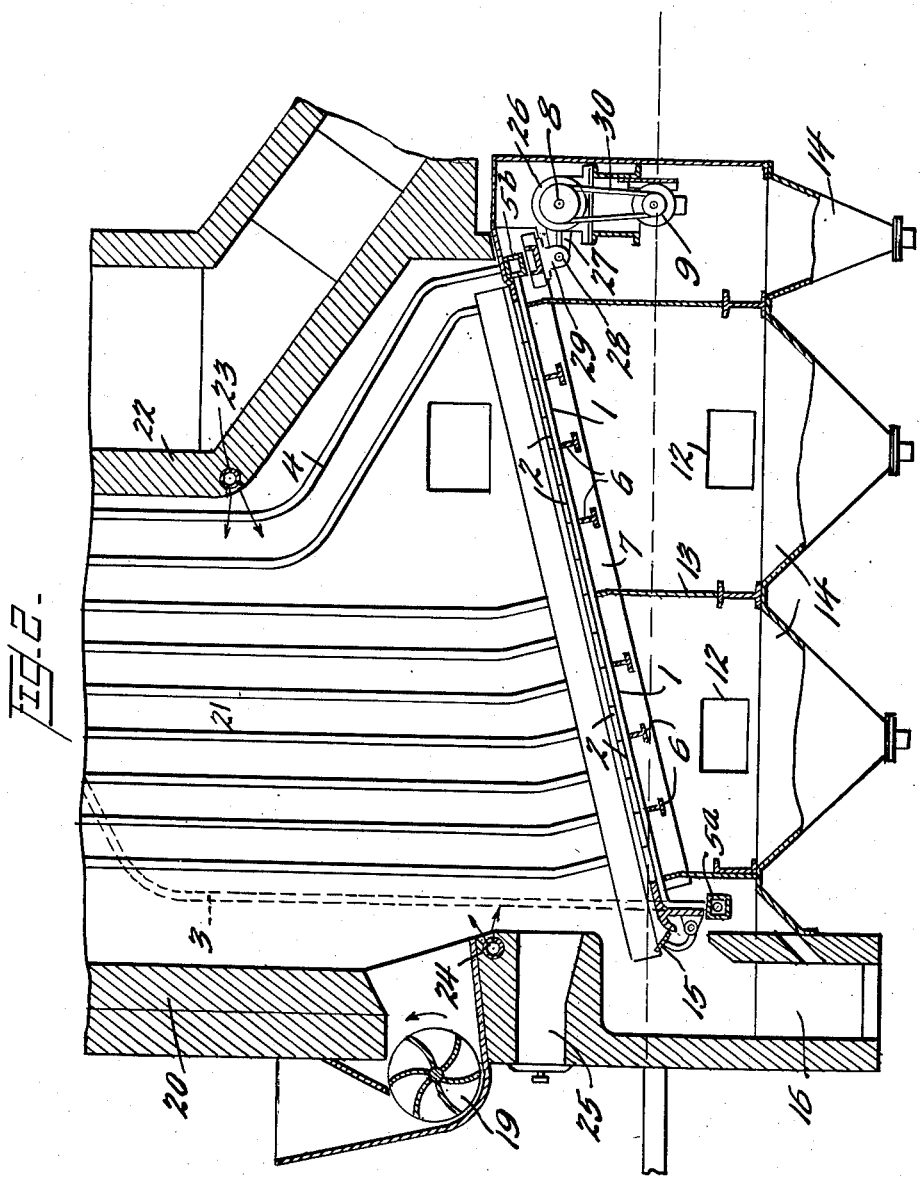

Sept. 18, 1956     E. BECKER ET AL     2,763,220
FIRING PLANT
Filed Aug. 7, 1950     4 Sheets-Sheet 3
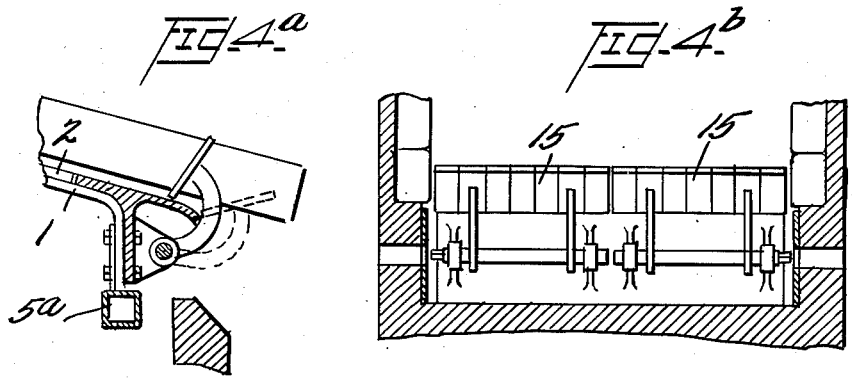
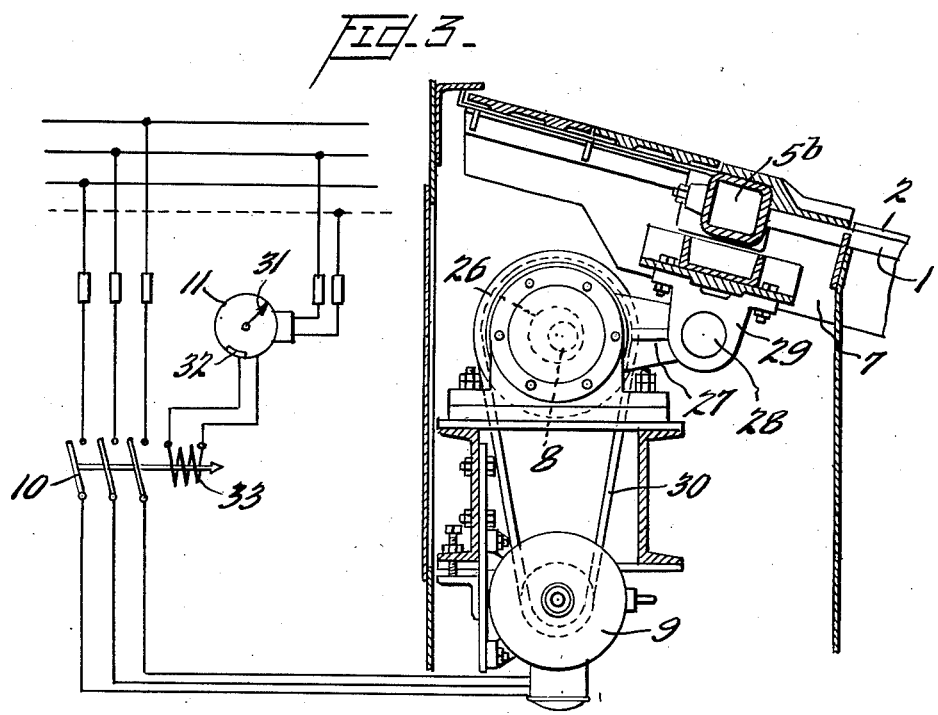
INVENTORS
Ernst Becker and
Helmut Weinstock
BY Watson, Cole, Grindle & Watson
ATTORNEYS

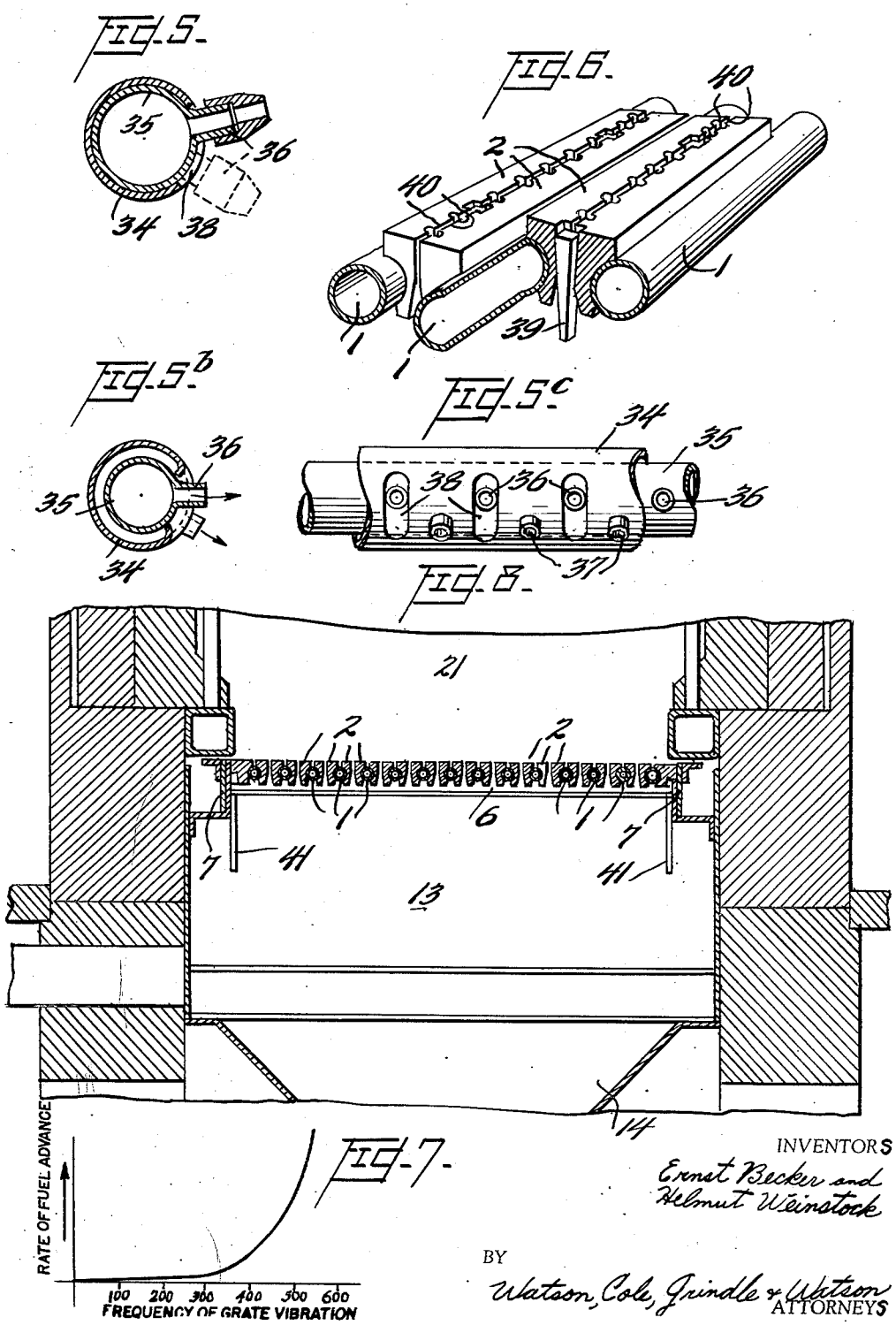

United States Patent Office 2,763,220
Patented Sept. 18, 1956

2,763,220

FIRING PLANT

Ernst Becker and Helmut Weinstock, Gummersbach, Germany, assignors to L. & C. Steinmuller, Gesellschaft mit beschrankter Haftung, Gummersbach, Germany, a German company Application August 7, 1950, Serial No. 178,006

Claims priority, application Germany January 23, 1950

1 Claim. (Cl. 110—38)

The present invention relates to firing plants for steam boilers and the like.

Firing plants employing water-cooled vibratory grates are known, wherein the fuel is advanced from the front of the boiler in the direction of the rear wall of the fire box. For supplying fuel to the firebox the normal devices are used in such constructions.

The required rate of advance of the fuel on such a grate must be in a correct proportion to the output of the plant and depends (a) On the inclination of the grate,
(b) On the frequency of the vibrating movement, and
(c) On the amplitude of the movements of the grate.

If the inclination of the grate is fixed and a certain output of the plant is required, a certain frequency of vibration relates to a fixed amplitude for the purpose of obtaining the necessary rate of advance of the fuel. As it is very complicated to construct the plant so that the inclination of the grate or the amplitude of the vibrating movements may be changed during operation, the adaptation of the fuel advance to the output is often made in known vibrating grate plants by changing the frequency of the shaking movements or vibrations.

It may be ascertained that on increasing the frequency of vibration of the grate, the rate of fuel advance at first increase only slightly but commencing at a certain point a rapid increase in the rate of advance of the fuel occurs with a small increase in frequency of vibration. In Fig. 7 of the drawings the dependency of the rate of fuel advance on the number of rotations of the eccentric shaft and, therefore, on the frequency of the grate vibration for a certain inclination of the grate, is diagrammatically shown.

A specially advantageous method for actuating the plant according to the invention consists in choosing a frequency of vibration of the grate which is within the region in which a high change of the rate of advance corresponds to a small change of frequency, while for preventing a too rapid feeding of fuel, the grate is vibrated only during short periods, while during the intermediate intervals the grate remains motionless.

For regulating the fuel advance measured over a period of time, according to the invention, it is not necessary to change either the frequency or the amplitude of the grate vibrations, but it is possible, according to the invention, to adapt the fuel advance to the required output by regulating the duration of the grate vibrating periods and quiet periods respectively. This is preferably done by means of an adjustable time switch, known per se for similar purposes. This method has the special advantage that because of the relatively high rate of fuel advance obtained by the high frequency of vibration, the amplitude of the grate movement may be kept very small.

As such vibrating grates must be provided with a water-cooled layer of grate bars to avoid burning on of the fuel onto the grate and a resulting unequal distribution of the fire layer, the diminishing of the amplitude of vibration obtained by the invention, enables the grate cooling system to be connected with the boiler circulation in a specially simple manner by means of normal boiler tubes without facing the danger of mechanically overstressing these tubes. Moreover, the firing operation according to the invention has the advantage that the fuel advanced and loosened during the short period of the vibrating movement lies still again during the intermediate relatively long pauses, so that the forming of quick ash is reduced to a minimum and a thorough and efficient burning of the fire bed is obtained.

In addition to the increased output and the ability to use a wide variety of fuel sizes, the plant of the present invention possesses a high resistance to wear and tear in consequence of the advantageous water cooling possibilities. Also, the lower half of the grate bars can be omitted, which was inconvenient in the known rearwardly running travelling grates provided with means for throwing in the combustible. The invention also permits construction of firing plants more favorably with respect to the required space, especially as now the slacks may be removed directly at the firer's station, also in connection with vibrating grates.

The heating plant according to the present invention is still further improved by subdividing the grate into zones, by means of separating sheets disposed therebeneath, which separating sheets serve also to support the grate carriage, permitting the elimination of other supporting elements. In order that the separating sheets may take part in the vibrating movement of the grate carriage these separating sheets are provided, according to the invention, with vertical slots near their respective side edges, enabling the part of each sheet between the slots to oscillate with the grate carriage. The necessity of providing a blower plant which itself oscillates with the grate carriage is thereby avoided.

A further object of the invention is the provision of a vibrating grate of the improved character described above, and preferably provided with water cooling, within a firebox in such a way that its feeding movements are directed toward the front wall of the firebox, a device being provided at the front wall of the firebox for throwing or projecting the fuel, in a manner known per se, through the firebox onto the rear of the grate. In this way a portion of the fuel is burned while suspended in the air, the remainder of the fuel being especially well mixed or agitated and burnt, because of the movements of the grate and because of the close contact thus obtained between the burning fuel on the grate and the fresh fuel being deposited thereon.

Other and further objects, features and advantages will be apparent from the description which follows, read in connection with the accompanying drawings in which Fig. 1 is a longitudinal vertical section of a furnace plant according to the invention with a water-cooled vibrating grate installed in a steam boiler;

Fig. 2 is a similar view of a furnace plant with a water-cooled vibrating grate with fuel feeding by a fuel throwing device;

Fig. 3 is a vertical section illustrating the vibrating mechanism inclusive of the driving motor and switching device;

Fig. 4a is a fragmentary vertical section showing the damming device at the lower end of the grate;

Fig. 4b is a transverse vertical section showing the device of Fig. 4a.

Fig. 5 is a transverse section of a secondary air injection nozzle;

Figs. 5b and 5c illustrate, in section and elevation, another embodiment of the secondary air nozzles;

Fig. 6 is a perspective view of a portion of the grate;

Fig. 7 shows schematically the principle of dependency of the fuel feed on the number of revolutions of the eccentric shaft at a certain grate inclination; and Fig. 8 is a section on line 8—8 of Fig. 1.

Figure 1:
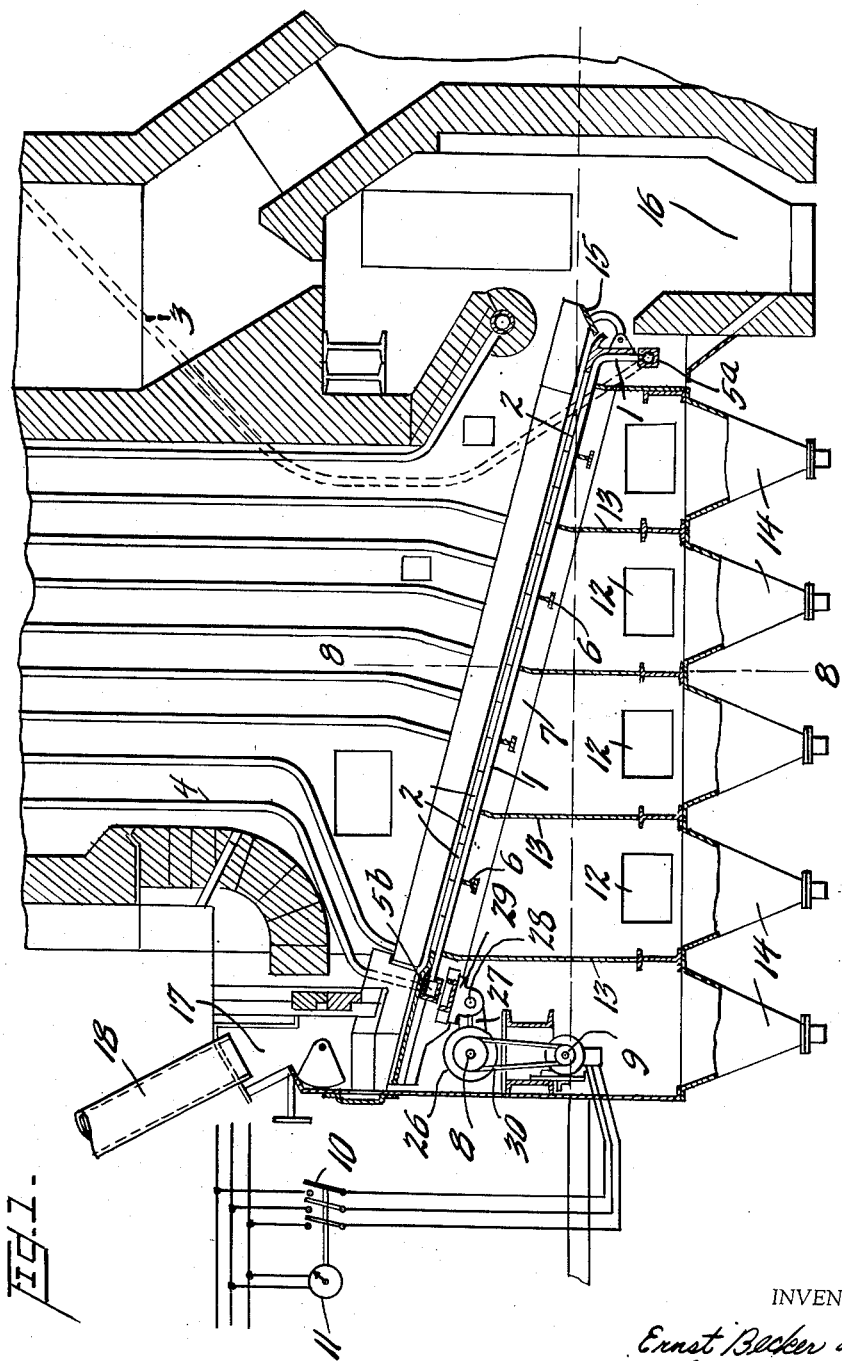

In order to facilitate an understanding of the invention, reference is made to the embodiments thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Fig. 1 shows the arrangement of a vibrating grate with simple feeding by gravity. The vibrating grate consists of a cooling pipe system 1, on which interchangeable grate bars 2 are arranged (also see Fig. 6). The grate cooling pipe system 1 is connected to the boiler circulation by downcomers 3 and ascending pipes 4. The grate cooling pipes are arranged between the headers 5a and 5b, and are supported on cross beams 6 by which they are maintained in proper spaced relation. The cross beams 6, as well as the headers 5a and 5b, are connected with the grate bearing frame 7, on which the eccentric 8 acts. The eccentric 8 is driven from motor 9, whose switch 10, as is shown on the drawing (also see Fig. 3) is opened and closed by a time switch 11. Switch 10 can also be operated by hand if desired. The grate bearing frame 7 and thus the whole grate are supported by the separating sheets 13 which simultaneously form the subdivision for the forced draught zones 12. The riddlings are received by the hoppers 14 and are carried off in the usual way. The residues of combustion falling from the end of the grate over the damming plate 15 are collected in the slag hopper 16 and are carried out by the usual devices or by hand. Also the feeding of the fresh fuel is performed by a feed hopper 17 which by way of example is fed by a chute 18.

In the further development of the invention, the above-described vibrating grate is combined with a fuel throwing device, as shown in Fig. 2. The fuel is thrown into the furnace 21 by the feeding device 19 which is arranged at the front wall 20 of the boiler. In this case the fine-grained components are burnt in suspension. The coarse-grained fuel components depositing on the inclined vibrating grate feeding to the front furnace wall 20, and already well pre-dried in suspension, fall on the glowing fuel bed and after having been burnt out completely in the vicinity of the firing floor level, they arrive at the slag hopper 16. In order to efficiently support the burning of the fuel and to direct the flames, swingable secondary air nozzles 23 and 24 are provided below the feeding device 19 and in the opposite furnace wall 22. In addition, air can also be blown into the furnace 21 from the lateral walls. For controlling the grate, an opening 25 is provided in the front wall 20 below the feeding device 19.

In Fig. 3 only the vibrating mechanism and the front grate part are shown on a larger scale. The eccentric 8 being on the one end connected with the eccentric shaft 26 and engaging on the other end link pin 28 in a convenient bearing 29 of the grate bearing frame 7, transmits the motion of the eccentric shaft 26 to the grate. The eccentric shaft 26 is driven by an appropriate transmission element 30 (for instance V-belt) by the motor 9. The drive does not operate continuously, but in a predetermined operating cycle. In this cycle the vibrating period is variable. The time switch 11 is indicated in Fig. 3. The rotating contact 31, shown as a pointer, when it reaches the contact 32, which is variable as to its length, initiates the closing of switch 10 and the rotation of motor 9, i. e., the grate is vibrated. This condition is maintained until contact 31 leaves contact 32 again. Thereupon the current flowing through the coil 33 is interrupted and switch 10 is opened, so that motor 9 and thus the grate stands still until contact 31 reaches contact 32 again and the process is repeated. The operation cycle is normally unchangeable. It can be changed, however, although this is not illustrated in the drawing.

During the vibrating movements the fuel slides forward on the grate and in addition is mixed thoroughly. The damming plate 15 at the end of the grate which, as shown in Figs. 4a and 4b, is adjustable as to its inclination, prevents the fuel from a premature discharge from the grate. The adjustability of the inclination can be omitted, however, and the damming plate 15 can be fixedly mounted. As shown in Fig. 4b, the damming plate 15 can also consist of several sections, especially in large grates.

In Fig. 5a an embodiment of the swingable air nozzles 23 and 24 (see Fig. 2) is shown, consisting of an air pipe 35 with nozzle projections 36 arranged in a protective pipe 34 serving as a bearing. In this embodiment the swinging of the nozzles 36 is obtained by rotating the air pipe 35. If, for instance, it is desired that the nozzles be swingable separately, for instance in two groups, the protective pipe 34, as shown in Figs. 5b and 5c, will be equipped with nozzles 37 and nozzle slots 38, and the inner air pipe 35 will be fitted with nozzles 36 swingable in the nozzle slots 38. In this case, both pipes can be rotated, while the nozzles can also be swung separately.

In Fig. 6 a portion of the grate is seen in perspective. The cooling pipes 1 support the grate bars 2, respectively, the grate bars being detachably connected with each other by the wedges 39. The grate bars 2 are constructed in such a way that there is a gap 40 between adjacent grate bars 2 for admitting the combustion air from the forced draught zone 12.

Fig. 7 shows schematically the principle of dependency of the fuel feed on the number of revolutions (frequency) of the eccentric shaft at a certain grate inclination.

Fig. 8 is a section on line 8—8 of Fig. 1 and shows that the separating sheets 13, which support the grate and by which, also, the subdivision of the space under the grate into the forced draught zones 12 is obtained, are provided with vertical slots 41, facilitating a simultaneous swinging of the separating sheets 13 with the grate, without impairing the separation of zones in this way.

Having thus particularly described the nature of our invention and the manner in which it is to be performed, what we wish to have covered by Letters Patent is:

A furnace for steam boilers, comprising a firebox having end and sidewalls, an inclined vibrating grate supported within said firebox with its lower end toward one wall of said firebox, said grate comprising a frame and grate bars supported on said frame, means for supplying fuel to the upper portion of said grate, damming means for retarding the discharge of ash from the lower end of said grate, said damming device comprising a plate extending across and secured to the lower end of said grate, said plate being inclined to the horizontal in a sense opposite to the inclination of said grate as a unit, a plurality of transverse vertical plates beneath said grate dividing the space therebeneath into zones extending transversely of said grate, each of said transverse plates being vertically slotted in its upper portion at points near its respective ends to permit the upper portion between said slots to move with the vibrations of said grate, said transverse plates being secured between said sidewalls and serving as support means for said grate so as to form an oscillating system therewith, means for vibrating said grate as a unit to cause downward movement of fuel resting thereon, means to actuate said vibrating means for predetermined intermittent periods separated by substantially longer intervals of standstill, so as to produce in each period a plurality of back-and-forth movements of equal duration and small amplitude, and means for supplying combustion air from below through said grate.

References Cited in the file of this patent
UNITED STATES PATENTS 527,593    Coxe   ------------------ Oct. 16, 1894

(Other references on following page)

UNITED STATES PATENTS

| | | |
|---|---|---|
| 541,448 | Wilkinson | June 18, 1895 |
| 783,614 | Cohen | Feb. 28, 1905 |
| 939,936 | Wilfley | Nov. 9, 1909 |
| 1,231,930 | Niclausse | July 3, 1917 |
| 1,393,979 | Skelly | Oct. 18, 1921 |
| 1,657,845 | Seidl | Jan. 31, 1928 |
| 1,840,117 | Losch | Jan. 5, 1932 |
| 1,840,374 | Thatcher | Jan. 12, 1932 |
| 1,886,064 | Steinmuller | Nov. 1, 1932 |
| 1,911,773 | Shivers | May 30, 1933 |
| 1,986,318 | Beers | Jan. 1, 1935 |
| 2,003,199 | Johnson et al. | May 29, 1935 |
| 2,110,452 | Moyer | Mar. 8, 1938 |
| 2,512,431 | Klijzing | June 20, 1950 |

FOREIGN PATENTS

| | | |
|---|---|---|
| 348,904 | Great Britain | May 21, 1931 |
| 550,915 | Great Britain | Jan. 29, 1943 |
| 561,099 | Germany | Oct. 10, 1932 |